US 6,944,653 B2

United States Patent
Fong et al.

(10) Patent No.: US 6,944,653 B2
(45) Date of Patent: Sep. 13, 2005

(54) ZERO-CLICK DEPLOYMENT OF DATA PROCESSING SYSTEMS

(75) Inventors: Ryan Patrick Fong, Castro Valley, CA (US); David J. Hu, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 762 days.

(21) Appl. No.: 09/953,396

(22) Filed: Sep. 14, 2001

(65) Prior Publication Data

US 2003/0069951 A1 Apr. 10, 2003

Related U.S. Application Data

(63) Continuation-in-part of application No. 09/944,313, filed on Aug. 30, 2001.

(51) Int. Cl.[7] ............ E06F 15/177; H04L 12/28
(52) U.S. Cl. ............ 709/220; 709/220; 709/221; 370/254; 370/255
(58) Field of Search ............ 709/201, 219, 709/220, 221, 223, 226, 29, 217, 222; 370/254, 255; 707/200, 202, 205

(56) References Cited

U.S. PATENT DOCUMENTS

| | | | | |
|---|---|---|---|---|
| 6,092,169 A | * | 7/2000 | Murthy et al. | 711/170 |
| 6,173,291 B1 | * | 1/2001 | Jenevein | 707/200 |
| 6,189,108 B1 | * | 2/2001 | Cromer et al. | 713/340 |
| 6,237,020 B1 | * | 5/2001 | Leymann et al. | 709/201 |
| 6,353,927 B1 | * | 3/2002 | Ali et al. | 717/174 |
| 6,405,309 B1 | * | 6/2002 | Cheng et al. | 713/1 |
| 6,466,972 B1 | * | 10/2002 | Paul et al. | 709/222 |
| 6,782,527 B1 | * | 8/2004 | Kouznetsov et al. | 717/103 |
| 6,810,364 B2 | * | 10/2004 | Conan et al. | 702/188 |

OTHER PUBLICATIONS

PowerQuest Corporation, PowerQuest DeployCenter 5.0 User Guide, Orem, Utah, Mar. 2001, pp. 1–4, 31–34, 38–39, 45, 59, 62, 74, 81–82, 92–93, 99, 109–110, 117–118, 130–131, 167–168, and 201–202.

Rembo Technology SARL, Rembo Auto–Deploy: the Automated Deployment Solution, Rembo Auto–Deploy User Manual, Geneva, Switzerland, Jun. 2001, pp. 13–16, 39–43, 45–51, 53–56, 78–79, 83–87, 98, 99, 129, and 141.

Microsoft Corporation, Microsoft Windows 2000 Guide to Unattended Setup, Redmond, Washington, 2000, pp. 1–4, and pp. 119–126 in Chapter 3 (The Sysprep Utility).

* cited by examiner

Primary Examiner—Saleh Najjar
Assistant Examiner—El Hadji Sall

(57) ABSTRACT

A method and computer network to autonomously deploy a group of data processing systems without human user interaction. One embodiment of the invention involves a method to deploy one or more data processing systems without human intervention. A second embodiment of the invention involves a computer network to facilitate the intelligent deployment of one or more data processing systems without human intervention. A third embodiment of the invention involves a computer program embodied on an electronically-readable media, containing instructions to deploy one or more data processing systems without human intervention.

26 Claims, 10 Drawing Sheets

ZERO-CLICK DEPLOYMENT OF DATA PROCESSING SYSTEMS

CROSS-REFERENCE TO CO-PENDING APPLICATIONS

This application is a continuation-in-part of the co-pending U.S. patent application, Ser. No. 09/944,313, entitled "One-Click Deployment of Data Processing Systems," filed on Aug. 30, 2001, by the common assignee, which is hereby incorporated by reference.

BACKGROUND OF THE INVENTION

1. Field of the Invention

This invention relates generally to providing a method to facilitate the set-up of a group of data processing systems, and more specifically to providing a method to quickly deploy a group of computers with a specific set of software and hardware parameters in a chaotic environment, remote environment, and any other environment where human operation and intervention is impossible, impractical, or undesirable.

2. Description of the Prior Art

Organizations have developed several in-house programs and procedures for deploying data processing systems (e.g., computer servers). These in-house programs and procedures have been less than comprehensive, and the complexity of deploying data processing systems has also been approximately proportional to the number of data processing systems involved. Such deployments are frequently extremely time-consuming and frustrating under the best of circumstances to human operators, and usually require extensive human operator knowledge and supervision.

Complex data processing system deployment (especially networks of dozens or hundreds of data processing systems) typically requires extensive intervention by highly specialized human operators. Such complex data processing system deployment may be especially difficult in times of serious business dislocations (e.g., during or after extensive layoffs, and so forth), since sufficiently knowledgeable human operators may no longer be unavailable, or no longer cooperative.

Complex data processing system deployment is also extremely demanding on human operators in chaotic environments (e.g., during or after earthquakes, fires, massive power failures, terrorist attacks, full-scale military battles and conflicts, and so forth), since sufficiently knowledgeable human operators may be unavailable, injured, or insufficiently calm and incapable of making correct decisions. Incorrect decisions in complex data processing system deployments can cause an extensive amount of very complicated and very subtle problems that require an enormous amount of debug and recovery time. However, debug and recovery time may be in very short supply when the crisis recovery requires an extremely quick recovery of operational capabilities.

Complex data processing system deployment in remote environments (e.g., monitoring sites near natural hazards, unmanned underwater vehicles, robotic repair equipment in radioactive and other hazardous areas of nuclear power plants and chemical plants, unmanned space vehicles, manned space vehicles with incapacitated crews, and so forth) may also require extremely quick and complex data processing system deployment during and after unforeseen events that greatly reduce or eliminate the command, communication, and control systems that originally allowed deployment participation by remote human operators. Deployment of data processing systems after such events can be impossible, or quite difficult and time consuming, if no fully automatic deployment capability exists. Furthermore, deployment of data processing systems may be necessary when the consequences of the unforeseen event require an extremely quick recovery of operational capabilities of the data processing systems.

Deployment of data processing systems includes selecting several software and hardware parameters. These parameters are listed in detail below, but include personalization information and options information, as well as other types of parameters (e.g., configuration parameters).

For example, one prior art deployment software product is the PowerQuest DeployCenter (available from PowerQuest, with corporate headquarters in Orem, Utah), which automates the capture and restoration of data (e.g., personal information) on end-user's systems, including network and operating system settings (e.g., this allows the user to elect the operating system settings to be transferred to other computers and affects the way that the operating system functions). The objects transferable during deployment include (but are not limited to): Desktop settings (e.g., for the Windows operating system this could include Active Desktop, Colors, Desktop Icons, Display, Icon Font, Pattern, Screen Saver, Wallpaper, Window Metrics and Start Menu); Personality settings (e.g., for the Windows operating system this could include Accessibility, Internet Browser Settings, Keyboard, Mouse, Printers, Send To Menu, Shell, Sound, Taskbar and User Profiles); Connectivity Settings (e.g., for the Windows operating system this could include Computer Description, Computer Name, DNS configuration, mapped drives, RAS networking connections, shared folders & drives, TCP/IP configuration, WINS configuration, Workgroup and Domain); Files (e.g., files that can be transferred at the same time as the settings).

However, the PowerQuest DeployCenter does not capture (i.e., take a snapshot of) the hardware configuration of a reference server, such as the hardware inventory, firmware settings, CMOS settings, boot order (e.g., booting from CD, disk drive, floppy diskette, or network), and the enablement/disablement of embedded hardware. The DeployCenter can only save information that is related to, or on, the actual disk drive being captured. Thus, it does not capture information about the hardware, the firmware settings, CMOS, boot order, or the enablement/disablement of any embedded hardware. It can manipulate the file system format, disk drive partitions, free space, and files.

Another prior art deployment software package is the Rembo Auto Deploy (RAD) package (available from Rembo Technology Sarl, with corporate headquarters in Carouge, Switzerland). This is a system image creation, management, and deployment tool intended to allow an administrator to take a snapshot of an operating system configuration for a computer, including: base disk image, application packages, configuration settings, and specific hardware configurations (such as firmware upgrades). RAD is driven from a central database containing unique parameters for each computer (including the rules that decide which images and software are applied to each computer). Parameters are set prior to deployment.

RAD assembles the target computer's operating system from various building blocks. The first is the base disk image. A base disk image is a copy of the hard disk contents (including the operating system) from a reference computer {e.g., in a Windows operating system this is prepared with the Microsoft System Preparation tool (SysPrep), available from Microsoft Corporation, with corporate headquarters in Redmond, Wash.}. On top of the base disk image, an administrator can apply software images. Software images are similar to base disk images, but are related to a specific piece of software. Multiple software images can be merged with the base disk image, and the combined base disk image and software images are written to a hard disk. At the end of the deployment, a SysPrep answer file (or a Linux equivalent file) is created and copied to the hard disk to customize the operating system.

However, the deployment process needs a specialized deployment center and may require manual intervention. In manual mode, RAD requires a user to enter specific computer configuration parameters and choose which software package to install. RAD uses a reference server to take a snapshot of some of the hardware inventory {including PCI devices, and desktop management interface (DMI) information}, disk drive settings, and CMOS settings.

However, RAD does not have features to control embedded hardware settings. RAD only images the first system disk drive or RAID volume as reported by the BIOS; alternate disk drives must be installed using operating system-based tools, or by using command lines. RAD only supports incremental images on the primary OS partition; the operator must use software updates packages with an unattended setup command line to install software on a secondary partition.

A major problem inhibiting deployment of a group of data processing systems is the complexity of setting up the software and parameters of a larger group of data processing systems. It would be desirable to provide a comprehensive method and system to intelligently deploy a group of data processing systems with a specific set of software, hardware firmware versions, and parameters without human intervention.

SUMMARY OF THE INVENTION

The present invention provides a comprehensive method and system to facilitate the deployment of a group of data processing systems with a specific set of software, hardware firmware versions, and parameters without human intervention. The invention can be implemented in numerous ways, such as a method, a computer network, and a computer program on electronically-readable media. Three aspects of the invention are described below.

A first aspect of the invention is directed to a method to deploy one or more data processing systems. The method includes capturing deployment information from a reference data processing system to deploy on the one or more data processing systems, wherein the deployment information is stored in a memory; selecting the one or more data processing systems; selecting a package of the deployment information to be deployed on the one or more data processing systems; and intelligently deploying the one or more data processing systems without human intervention, wherein the intelligently deploying includes referencing the package of deployment information that is stored in the memory.

A second aspect of the invention is directed to a computer network to facilitate the intelligent deployment of one or more data processing systems. The computer network includes one or more data processing systems to be intelligently deployed; one or more reference data processing systems containing deployment information; a means for transmission capable of conveying the deployment information to the one or more data processing systems without human intervention; and a dedicated data processing system containing deployment information copied from the one or more reference data processing systems, wherein the dedicated data processing system conveys to the one or more data processing systems over the means for transmission a package of deployment information selected from the deployment information.

A third aspect of the invention is directed to a computer program embodied on electronically-readable media, containing instructions to facilitate the deployment of one or more data processing systems. The computer program includes a program code segment to capture deployment information from a reference data processing system to deploy on the one or more data processing systems, wherein the deployment information is stored in a memory; a program code segment to select one or more data processing systems to be included in the one or more data processing systems; a program code segment to select a package of the deployment information to be deployed on the one or more data processing systems; and a program code segment to intelligently deploy the one or more data processing systems without human intervention, including program code to reference the package of deployment information that is stored in the memory.

These and other objects and advantages of the invention will become apparent to those skilled in the art from the following detailed description of the invention and the accompanying drawings.

DETAILED DESCRIPTION OF THE PREFERRED EMBODIMENTS

The invention provides a method and a system to facilitate the deployment of a group of data processing systems. One most preferred embodiment of the invention is implemented on a computer network that is connected or coupled to what is commonly referred to as the Internet or the World Wide Web.

Intelligent Deployment

Both zero-click deployment and one-click deployment (discussed in the co-pending U.S. patent application, Ser. No. 09/944,313, entitled "One-Click Deployment of Data Processing Systems," filed on Aug. 30, 2001, by the common assignee, which is hereby incorporated by reference), most preferably include intelligent deployment. Intelligent zero-click deployment includes deployment initiation, where the zero-click deployment software compares the program-selected hardware and/or software attributes to the target data processing systems. Intelligent deployment also includes testing for a successful match of the target data processing system attributes against the match criteria attributes; a match indicates a successful deployment candidate (in this case deployment is allowed to continue). However, if the match of attributes is unsuccessful, the zero-click deployment software can decide whether the deployment proceeds. Intelligent zero-click deployment can also stop deployment when a mismatch of attributes occurs due to target data processing system incompatibility, or suspend the deployment until an adjustment is made in the target data processing system(s) or in the deployment itself, or continue the deployment. The attributes originate from a pre-defined list, which can be included or excluded from the attribute comparison prior to deployment initiation.

Figure 1:
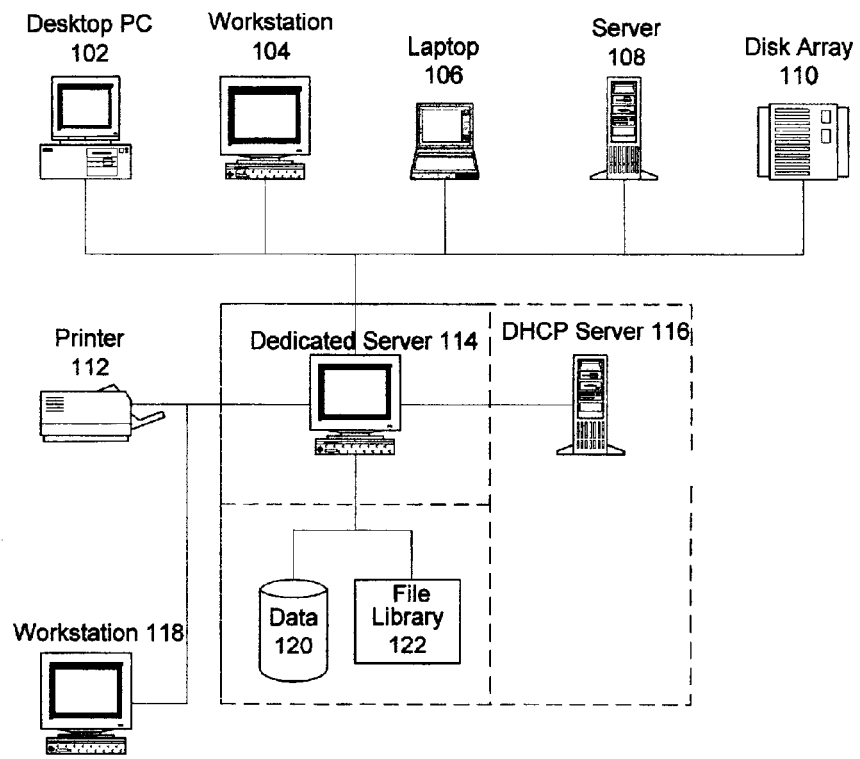
FIG. 1 illustrates a typical configuration of one or more data processing systems, in accordance with one application of a preferred embodiment of the present invention.

FIG. 1 illustrates a typical configuration of one or more data processing systems, in accordance with one application of a preferred embodiment of the present invention. The desktop personal computer 102, workstation 104, laptop computer 106 server 108, disk array 110, and a printer 112 are connected through a network (e.g., a data processing network) to a dedicated server 114. The dedicated server 114 would typically be running a recent version of Windows or Linux (e.g., RedHat Linux) on a Netserver/HP Unix server system (or this could be any system capable of running the deployment software of the present invention and the deployment software plug-in components of a vendor), and be connected to a network. Preferably, a Web browser on a workstation 118 can be used to remotely access the dedicated server 114. The dedicated server 114 would typically include a Pre-boot Execution Environment (PXE) server (to load an operating system from a remote boot server prior to beginning actual deployment), a database 120, and a file library 122. The file library 122 contains image and utility libraries normally installed as part of the software of the dedicated server 114. The database 120 and file library 122 may or may not be located on the same data processing system as the dedicated server 114. In one embodiment, the dynamic host configuration protocol (DHCP) server 116 is on the same data processing system as the dedicated server 114, but in another embodiment the DHCP server 116 is on a different data processing system. When a server provides this data processing system network service on the network, it will dynamically configure a data processing system's network settings, including the IP address, subnet, DNS server, lease expiration date, and other settings. In preferred embodiments, a PXE Server is implemented as part of the dedicated server 114. If there is a router between the PXE Server and a target data processing system, the router must be setup to route the appropriate network packets. A BOOTP packet is a specific type of packet that the router may or may not route depending on its configuration. The router preferably supports all packets that are needed for transmission over the network to target data processing systems.

The reference data processing system and target data processing systems preferably include PXE supporting network cards. Usually the network interface cards (NICs) have PXE-boot devices that are always available, but the default boot order may be selectively modified to specify the PXE-enabled NIC at the top of the boot order. Preferably, the data processing systems are connected to the same network as the dedicated server. Preferably, the data processing systems support Wake-on-LAN (WOL), or another wake-up mechanism (listed in Table 3 below), and include network cards with WOL enabled. The dedicated server 114 preferably has a management console running on a workstation in a supported Web browser. The printer 112 is connected to the dedicated server or network for printing asset management reports. Components that may be required in addition to the dedicated server software include: SysPrep from Microsoft and/or equivalent Linux utility, BIOS and firmware version readers, update utilities, ROM files, configuration binary/text files, configuration utilities from vendors (e.g., utilities for BIOS, SCSI, and RAID), and a supported database (e.g., an ORACLE database).

A PXE-boot process is preferred, but not required on data processing systems with an Intel architecture. A PXE-boot process is not necessary for data processing systems with a Hewlett-Packard proprietary architecture (e.g., the Prism architecture). Before the PXE-boot process can begin, a data processing system may need to be powered-on or rebooted. A preferred way to power-on a data processing system is through WOL, when the data processing system has WOL capabilities and WOL is enabled. However, since activating a data processing system through WOL requires user input at a console, a preferred method of starting a data processing system prior to a zero-click deployment would use the power switch located on the data processing system. PXE would then occur during the PXE-boot process, which would happen if the data processing system automatically reboots itself, or if an installation technician presses the power button on the data processing system itself at the installation site. Neither process would require any user input through a remote web console.

Figure 2:
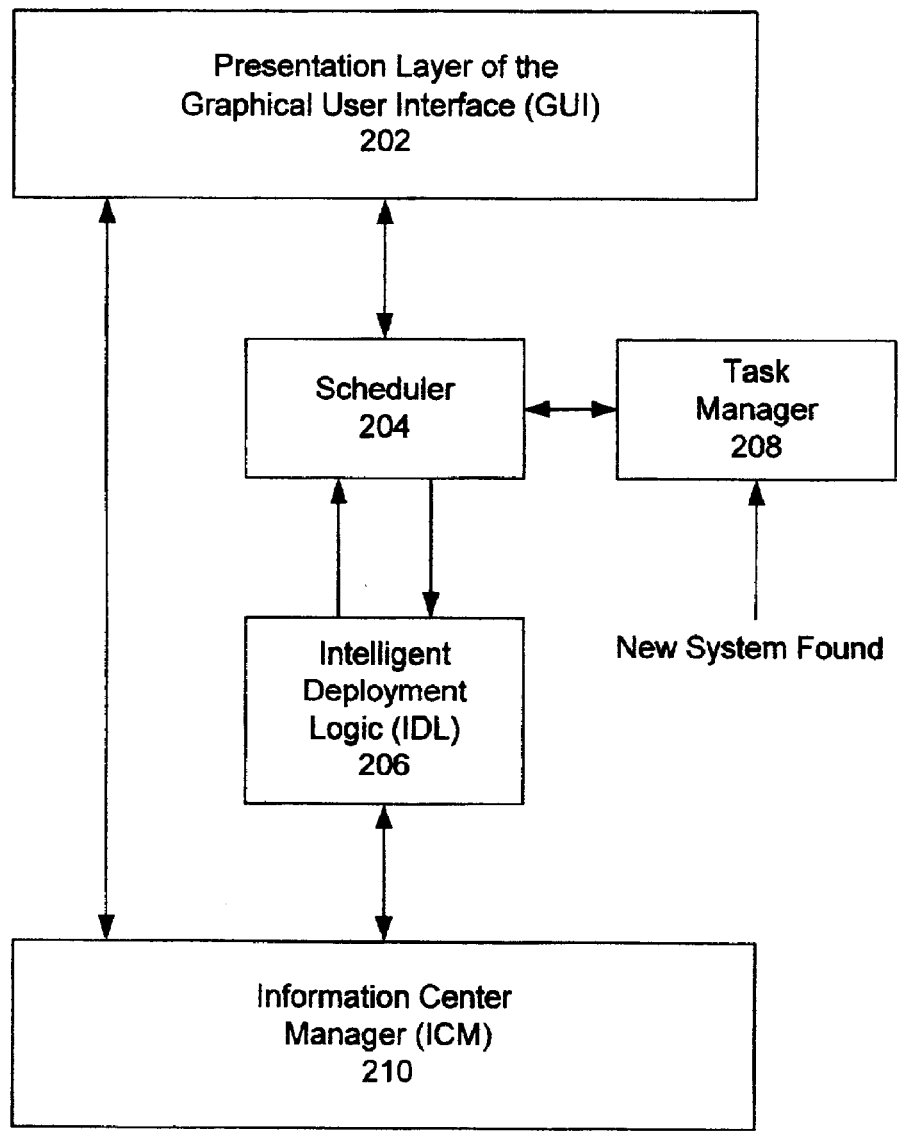
FIG. 2 illustrates an architectural block diagram for one preferred embodiment of the invention.

FIG. 2 illustrates an architectural block diagram for one preferred embodiment of the invention. The presentation layer of the graphical user interface (GUI) 202 communicates with the Information Center Manager (ICM) 210 to present one-click deployment information to users. The GUI 202 communicates with a scheduler 204. The scheduler 204 communicates with the Intelligent Deployment Logic (IDL) 206 to have rules applied to a set of target data processing systems. The IDL 206 communicates with the ICM 210 for specific information regarding rules and target data processing systems. The scheduler 204 communicates with the task manager 208 to execute specific tasks, such as deployment when new data processing systems are found.

In preferred embodiments of the invention for zero-click deployment, the task manager 208 will be informed by a third party software plug-in that a data processing system has been found. If there is no task associated with it, the task manager 208 informs the scheduler 204 of a new data processing system. The scheduler 204 will communicate with the IDL 206 to have rules applied to a set of target data processing systems.

Figure 3:
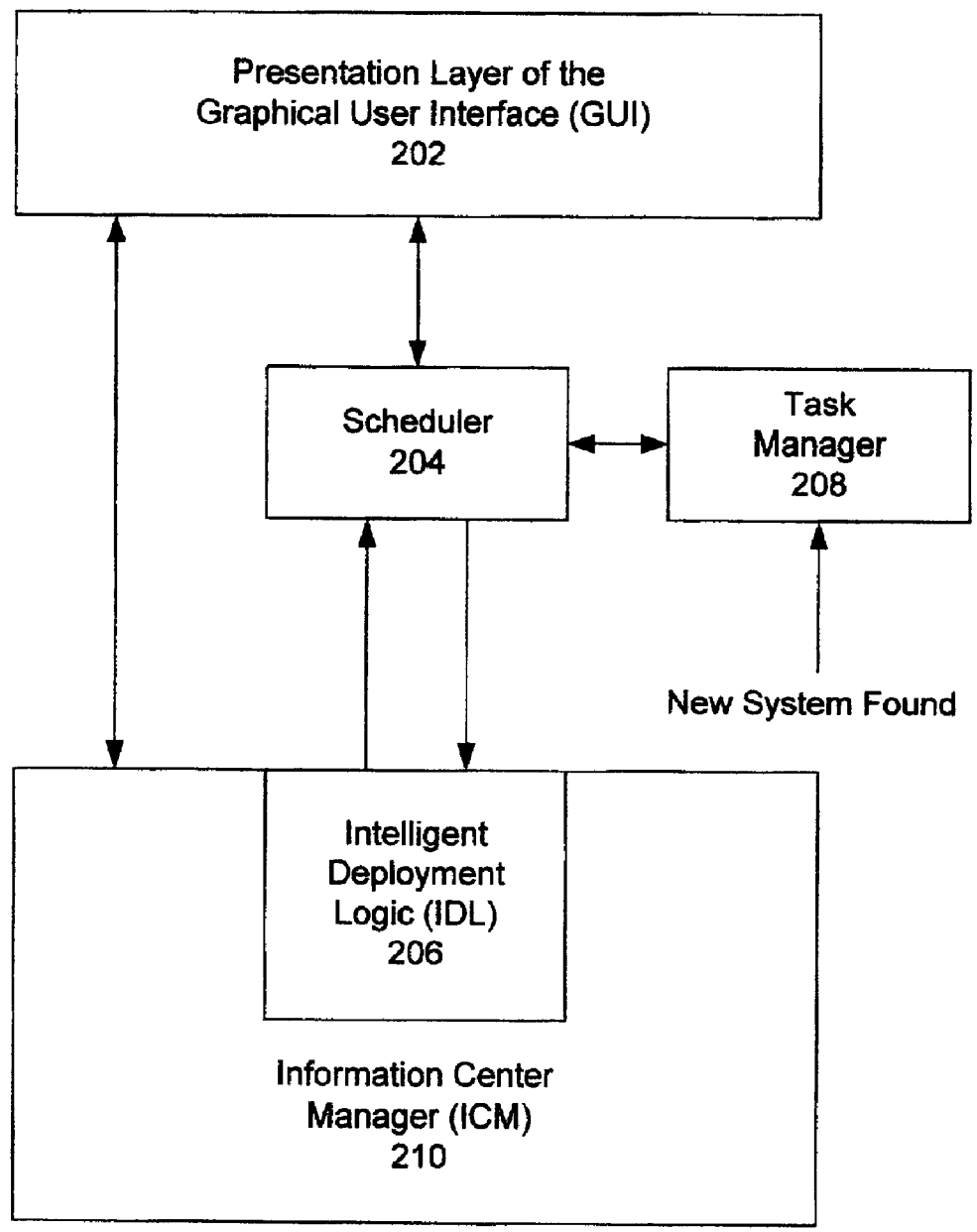
FIG. 3 illustrates an alternative embodiment of the invention, where the intelligent deployment logic (IDL) is not a stand-alone module, and the IDL is part of the information center manager (ICM).

FIG. 3 illustrates an alternative embodiment of the invention, where the IDL 206 is not a stand-alone module, and the IDL 206 is part of the ICM 210. Here, the presentation layer of the GUI 202 communicates with the ICM 210 to present one-click deployment information to users. The GUI 202 communicates with a scheduler 204. The scheduler 204 communicates with the ICM 210 (which contains an IDL 206) to have rules applied to a set of target data processing systems. The IDL 206 inside the ICM 210 communicates with the ICM 210 for specific information regarding rules and target data processing systems. The scheduler 204 communicates with the task manager 208 to execute specific tasks, such as deployment when new data processing systems are found. In preferred embodiments of the invention for zero-click deployment, the task manager 208 will be informed by a third party software plug-in that a data processing system has been found. If there is no task associated with it, the task manager 208 informs the scheduler 204 of a new data processing system. The scheduler 204 will communicate with the ICM 210 (the IDL 206) to have rules applied to a set of target data processing systems.

Discovery

The discovery program determines the system hardware and firmware configuration information for one or more data processing systems, and saves this information for future reference. This information is preferably saved on a non-volatile memory, such as a magnetic disk drive, a magneto-optic disk drive, a floppy diskette, a compact disc, or a flash memory. Alternatively, the information can be saved on a volatile memory, such as a random access memory (RAM). Table 1 lists some discovery features.

TABLE 1

Discovery Features

| Feature | Description |
| --- | --- |
| Independent from External Components | In preferred embodiments, the discovery program is independent from the implementation of other features, such as the image capture and deployment features. |
| DOS Program | Preferred embodiments are implemented as a DOS program. |
| Run from DOS or OS | Preferred embodiments can run from a bootable DOS environment, or from a supported network operating system (NOS). |
| Remote and unattended | Preferred embodiments can be initiated remotely across a network connection and can operate without any user intervention. |
| Data Stored for Future Reference | Preferably, discovery data is added to a database stored locally as a file (e.g., text, or binary) on the system, or remotely on a dedicated server, depending on the Discovery program. |
| Validation | Preferred embodiments support validation against an existing system's hardware/firmware configuration to determine whether a system's hardware changed since the previous discovery process. |
| Local Storage Information | Preferred embodiments of local storage discovery obtain some or all of the following information: Number of physical disk drives. Firmware version of each physical disk. Capacity of each physical disk drive. Number of partitions on each physical disk drive. Capacity of each partition. Capacity of un-partitioned space on each disk drive. File system format on each partition (with support for a utility partition from Hewlett-Packard (HP) and/or other vendors). Physical disk and partition number of the active boot partition (MBR). Empty/non-empty status of each partition. Physical disk and partition number of the NOS drive. Whether a partition is exclusively for a page or swap file. |
| RAID Storage Information | Preferred embodiments of the invention use discovery to obtain some or all of the following information about RAID storage: Drive numbers of logical RAID drives. RAID configuration. Number of Disk Array Controllers (DAC). Vendor for each DAC. |

TABLE 1-continued

Discovery Features

| Feature | Description |
| --- | --- |
| | Vendor specific model for each DAC. DAC BIOS and firmware version information. |
| System Hardware Information | In preferred embodiments, some or all of the following system hardware information is obtained through discovery: System model identification. System Basic Input Output Software (BIOS) version. System F2 setup configuration (CMOS & related chips, random access memory (RAM) information (e.g., capacity, type, speed, number of chips, and error correcting capability (ECC)), central processing unit (CPU) information, (e.g., vendor, model, & speed)). Video card information (e.g., vendor & BIOS/firmware version). Maximum vertical refresh rate of an attached monitor. Network Interface Card (NIC) detection. Small Computer Serial Interface (SCSI) controller information, such as vendor, model and firmware versions. Enhanced Integrated Drive Electronics (EIDE/IDE) controller information (e.g., current configuration). Peripheral Computer Interface (PCI) slot information, including the number of PCI slots and the types of devices in the slots. Intel Standard Architecture (ISA) slot information, including the number of ISA slots and the types of devices in the slots. Advanced Graphics Port (AGP) slot information, including the vendor, model, and firmware version of the card in the slot. |

Image Capture

Preferred embodiments of image capture can be used to capture a system's hardware configuration, base software image, and/or incremental software images. Table 2 lists some differences between discovery and image capturing. Table 3 follows Table 2 and lists some preferred image capturing features.

TABLE 2

Discovery and Image Capturing

| Feature | Description |
| --- | --- |
| Discovery | Discovery preferably automatically runs the discovery action to obtain a system's hardware and software information. |
| Image Capturing Captures Reference System Configuration and Images | Image capture preferably captures the hardware configuration, base software image, and/or incremental software images from a reference system. The capturing process is non-destructive to the reference system's existing configuration. |

A more preferred embodiment of the invention provides a programming code segment to capture hardware information (e.g., both text data and/or binary data), and to transmit the hardware information (e.g., CPU information, PCI information, BIOS information, and so forth) back to a dedicated server. Third-party utilities (e.g., deployment utility software from vendors like Rembo or PowerQuest) can be used, if necessary, to capture or deploy the data (e.g., software image(s) on the hard drive(s) of reference systems) for Intel-based systems, and can be used to deliver the hardware info capture and configuration program code segments to the data processing systems. Additionally, third-party utilities may be used to capture and deploy software image(s) on non-Intel-based data processing systems. A preferred embodiment provides a database for storing references to software image store(s) after software image(s) are put on the dedicated server. In addition to storing references to software image(s), other value-added information (e.g., hardware info) is stored in the database of the dedicated server that stores the software image(s).

TABLE 3

Some Preferred Image Capture Features

| Feature | Description |
|---|---|
| Hardware Configuration | Captures a reference system's profile. To create a system hardware configuration, image capture obtains some of the information below:<br>System BIOS Vendor, Version, Release Date, ROM Size.<br>System BIOS configuration (captured text or binary file).<br>All PCI (and non-PCI) device BIOS and firmware versions & configurations, including Redundant Arrays of Inexpensive Disks, SCSI controllers, other disk controllers.<br>Advanced Graphics Port (AGP) video BIOS & firmware.<br>Motherboard-embedded device info, BIOS & firmware.<br>System information {e.g., manufacturer, product name, version, serial number, universal unique identification (UUID), & wake-up mechanism (e.g. LAN Remote, Power Switch, PCI, Modem Ring, APM Timer, and equivalents)}.<br>Processor information (e.g., socket designation, type, family, manufacturer, ID, version, voltage, clock frequencies).<br>Cache information (e.g., internal/external cache configuration, maximum cache size, installed cache size, & system cache type).<br>Memory Devices (e.g., location, use, memory error correction, maximum capacity, and number of memory devices, memory array handle, total width in bits, data width in bits, size, form factor (i.e., type of RAM; e.g., SDRAM, DIMM, SIMM DDR, & so forth), device set, device locator (i.e., to identify the physical socket or board position), back locator (i.e., to identify the physical bank of the device)}.<br>Networks (e.g., LAN, WAN, Internet, wireless networks, and direct connection).<br>Preferred embodiments dynamically create a DOS bootable image containing the system profile files and utilities. Preferably, the hardware configuration supports a unique identifier and a link to the reference system's system profile in the database. |
| Base Software Image | A preferred embodiment captures a base software image, typically including a NOS image, of a reference system. A base software image is associated with a link to the reference system's profile in the database. Preferred embodiments support some of the following NOS images:<br>Windows NT 4.0, Windows 2000 Server, Windows XP<br>RedHat Linux, SuSe Linux, Debian Linux<br>HP-UX<br>and future upgrades and enhancements of the above NOS. |
| Incremental Software Image | A preferred embodiment captures incremental software images by differencing the current software configuration with an existing base software image. Preferably, incremental software images are linked to the reference system's system profile and to the base software image in the database. |
| Multiple Drives and Partitions | Preferably, the image capture process supports imaging multiple partitions on a drive, multiple drives and partitions across one or more physical drives. Preferably, the image capture process automatically captures all partitions on all drives, and links the images together as a base or incremental software image. |
| Complete ("Zero-Click") System Capture | Allows creation of a hardware configuration and base software image without human operator intervention. |

Deployment

Figure 4:
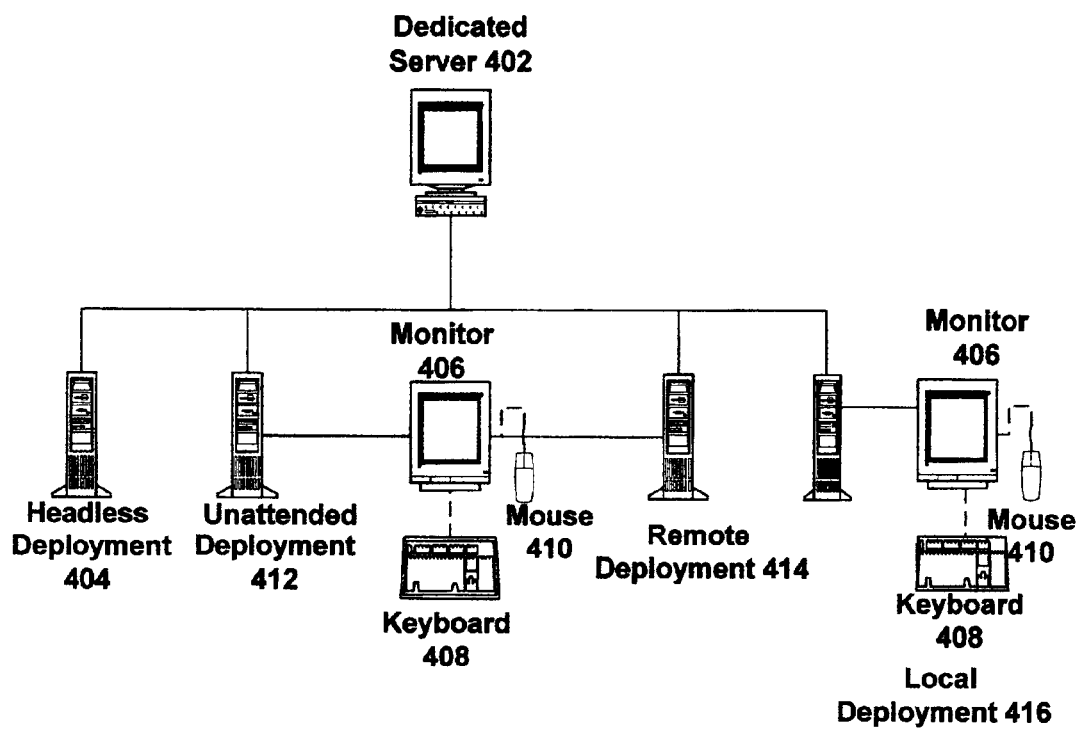
FIG. 4 illustrates some deployment options, according to a preferred embodiment of the present invention.

Deployment in preferred embodiments of the invention are done remotely without any interaction from the user and can be done in headless systems. FIG. 4 illustrates some deployment options, according to a preferred embodiment of the present invention. The dedicated server 402 is connected to various data processing systems. Headless Deployment 404 involves a data processing system that is not connected to a monitor 406, keyboard 408, or mouse 410. The data processing system has headless BIOS support and deployment typically is both unattended and remote in this deployment option. Unattended Deployment 412 does not require human interaction. The data processing system may or may not be headless. An alternative embodiment can include a centralized deployment server that is able to control deployment on this system without the need for a GUI on the target data processing system.

A more preferred option for data processing system deployment is Headless Deployment 404, which assumes that the deployment is remote and unattended. Another preferred option is remote-unattended deployment, which appears as a Headless Deployment 404, although the data processing system is physically connected to a console.

Preferred embodiments of the present invention can deploy multiple data processing systems, and deploy hardware configurations and software images as specified by the Image Capture process. Table 4 lists a summary of preferred deployment features that can be supported as necessary in various embodiments of the invention.

TABLE 4

Preferred Deployment Options

| Feature | Description |
|---|---|
| Headless Deployment | Preferably, the system supports headless operation. Even if the system does not support true headless deployment, preferably deployment can done remotely and unattended. Preferred embodiments of Zero-Click Deployment will deploy to any data processing system as if it were a headless or remote, unattended system. This method of operation requires no user input. |
| Unattended Deployment | Deployment does not need user interaction. Unattended deployment may or may not be done remotely. |
| Group Deployment | Deployment preferably supports multicast technologies and handles multiple system and images with one deployment action. |
| Deploy Hardware Configuration | Preferably, deployment of a hardware configuration is done alone, or as part of deploying a complete system. If deployed alone, the hardware configuration should not be destructive to the target's existing software configuration. Preferably, hardware configuration utilities are deployed with a bootable DOS image, along with the necessary configuration data files created during hardware configuration image capture. Preferably, the DOS image is used to run the hardware and firmware utilities, and it is removed from the target system when the utilities are finished. Preferably, in order to deploy the hardware configuration, the system profile associated with the reference system matches the target's system profile. |
| Deploy Base Software Image | Preferably, software images are deployed as specified by the Image Capture process. The target's system profile preferably matches the reference system's profile. In addition to matching the target and reference system profiles, deployment of software or incremental images uses some or all of the following database information:<br>Logical drive of each partition.<br>Number of partitions on each drive.<br>Partition size.<br>Partition file system format (e.g., HP's utility partition).<br>Whether it is a swap partition.<br>Disk and partition number of the active boot partition. |

TABLE 4-continued

Preferred Deployment Options

| Feature | Description |
| --- | --- |
| | A link to the image associated with each partition. In preferred embodiments, deployment creates and formats partitions and deploys images as part of base or incremental software images. The reference system's profile preferably determines how the partitions are created, and how the image is restored on each partition. |
| Deploy Incremental Software Image | Preferably, incremental images can be deployed alone, with a hardware configuration, or with a base software image. Preferred embodiments ensure that incremental images are deployed on top of the base software image from which they were created during Image Capture. |
| Multiple Drives and Partitions | A preferred embodiment supports deployment to multiple partitions on a single drive, multiple drives, and partitions across multiple physical drives. |

Preferred embodiments of the invention can update a data processing system's hardware configuration in a non-destructive manner, both before software image deployment, and on a data processing system that has already been configured. In other words, the hardware configuration can be updated at any time without modifying the remaining portion of the configuration of the data processing system.

Re-Deployment

The most preferred embodiment is able to deploy new or additional hardware configuration and/or software image(s) to a system that has already been deployed. Re-deployment could be used to update a systems hardware configuration, deploy additional software components with incremental images, or completely change the configuration of a system by deploying a different base software image. Re-deployment involves regaining control over a system that is currently running a network operating system (NOS). Table 5 lists selectively included re-deployment features.

TABLE 5

Some Preferred Re-Deployment Features

| Feature | Description |
| --- | --- |
| Cancel Deployment | Preferably, a user may cancel the deployment process during any stage. When canceling deployment, the user is preferably given a choice to either rollback deployment, or to simply cancel the process. Since certain stages of deployment are difficult to cancel (e.g., restoring an image), cancellation preferably takes place at the earliest possible step of deployment. |
| Restart Deployment | Preferably, the deployment process may be restarted after cancellation, or once a deployment error has been corrected. Preferably, the deployment process can resume at the last uncompleted stage. |
| Rollback Deployment | Preferably, deployment can be used to rollback a system to a previous state (e.g., after canceling a deployment process, so that the system can be deployed back to the previous deployment state). |
| Rules-Based Deployment | Preferably, it is possible to define a set of rules for automatically deploying configurations and images. |

Asset Management

In preferred embodiments, asset management includes database operations, administration, and a scheduling utility.

Table 6 lists some preferred asset management features.

TABLE 6

Asset Management Features

| Feature | Description |
| --- | --- |
| Defined Groups | Preferred embodiments can create groups of systems for purposes such as deployment or discovery. |
| Rule-Based Grouping | Grouping rules can be maintained in the deployment database and used to automatically place a new system in an existing group. |
| Rule-Based Deployment | Deployment rules can be maintained in the database for automatic deployment of hardware configurations or images. |
| Validation | Preferably, asset management supports validation of systems, groups, hardware configurations, and images by matching system profiles. System profiles preferably match some or all of the following: System model. Number and size of hard drives. PCI card data. Number and size of partitions (unless the system is a new target). NOS (unless the system is a new target). And other attributes mentioned in the discovery section. |
| Utility Library | Preferred embodiments of the invention can add, update, or delete files in the utility library (for use during discovery, image capture, or deployment). |
| Unique System Information | Preferred embodiments of the invention can insert, modify or delete system information. System information can include one or more of the following: IP address(es) or DHCP. Network name. Organization name. Domain. User name and password. Time zone and language. Regional options. Network options. |
| Default System Information | Preferably, unique system information is automated by using default information for selected systems. Preferred embodiments use the default information entered to automatically create unique information for each of the selected systems. |

Preferred embodiments of the invention will be able to create rules that will apply to all deployments within a group, or across groups, that will automatically affect what is deployed to a data processing system according to whatever knowledge is already known about a target data processing system.

Preferably, the present invention will support data processing system deployments in locations where network connectivity is not available by providing bootable CD or diskette sets. These CDs or diskettes can be used for deploying any data processing system, with the option of letting the user enter computer configuration settings or specific software packages. Furthermore, preferred embodiments of the present invention will separate the base image from the application software package images, so that even if the application software packages are created on a specific platform (the reference computer), they can be deployed to other platforms (other system images) without requiring modifications.

Preferably, the present invention will be capable of deploying different configurations across several data processing systems simultaneously by using a multicast transport protocol. Multicasting makes it possible to optimize network usage, since files that are needed by several data processing systems will only be sent once, instead of being sent to each data processing system individually. Preferably, status reports are sent to a central console to help an administrator monitor the deployment.

Figure 5A:
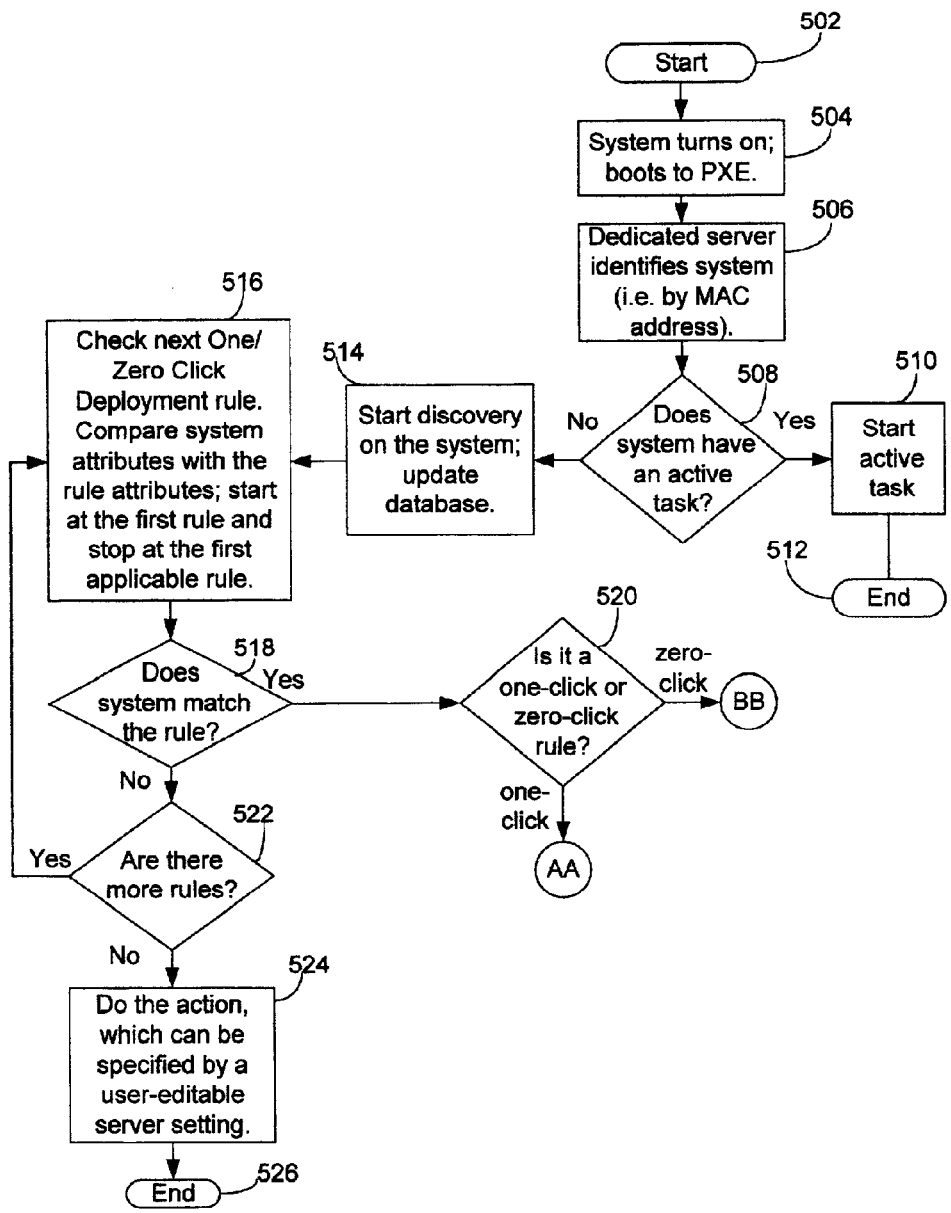
FIG. 5A illustrates a process flow chart for one embodiment of the invention that is capable of both one-click deployment and zero-click deployment.
Figure 5B:
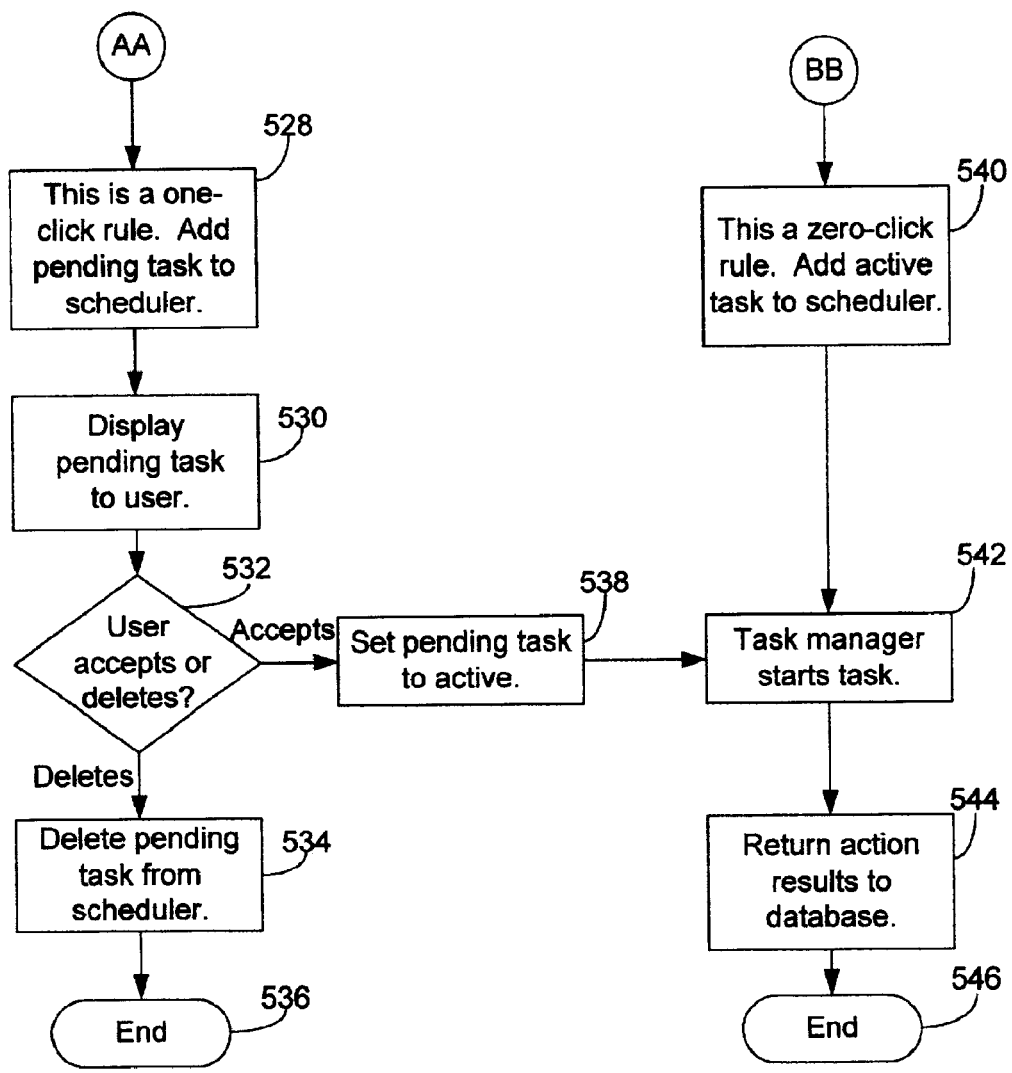
FIG. 5B continues the process flow chart starting at step AA for one-click deployment and starting at BB for zero-click deployment, as illustrated on FIG. 5A for one embodiment of the invention.

FIG. 5A illustrates a process flow chart for one embodiment of the invention that is capable of both one-click deployment and zero-click deployment. The method starts in operation 502. Operation 504 is next, where a preferred embodiment of the invention includes a program module that will work in the background and listen for new systems that are powered on, and start PXE. Operation 506 is next, where a dedicated server identifies the data processing system {e.g., by the media access control (MAC) address}. Operation 508 is next, where a test is made to determine whether or not there is a task already defined for that data processing system. If the test of operation 508 determines that there is an active task, then operation 510 is next and the active task is started. Operation 512 is next, where the method ends. However, if the test of operation 508 determines there is no active task, then operation 514 is next where the discovery and rules checking process starts. As the flow chart shows, there may be a deployment if certain criteria are met. In operation 516 the next deployment rule is checked. This includes comparing the data processing system attributes to the rule attributes, starting at the first rule and stopping at the first applicable rule. Operation 518 is next, where a test is made to determine if the data processing system matches the rule. If the test of operation 518 determines a match, operation 520 is next, where a test is made to determine if the rule is a one-click or zero-click rule. If the rule is a one-click rule, step AA on FIG. 5B is next. If the rule is a zero-click rule, step BB on FIG. 5B is next. However, if the data processing system does not match the rule, then operation 522 is next, where a test is made to determine if there are more rules. If there are more rules, then operation 516 is repeated. If there are no more rules, then operation 524 is next, where the action is performed, and a user-editable server setting can specify the action. Then operation 526 is next, where the method ends.

FIG. 5B continues the process flow chart starting at step AA for one-click deployment and starting at BB for zero-click deployment, as illustrated on FIG. 5A for one embodiment of the invention. The method continues from step AA for a one-click rule in operation 528, where the pending task is added to the task manager. Operation 530 is next, where the pending task is displayed to a user. Operation 532 is next, where a test is made to determine if the user accepts or deletes the task. If the user chooses deletion, then operation 534 is next, where the pending task is deleted from the scheduler. Operation 536 is next, where the method ends. However, if user accepts the task, then operation 538 is next, where the pending task is set to active and operation 542 is next.

The method continues from step BB for a zero-click rule in operation 540, where the pending task is added to the scheduler. Operation 542 is next, where the task manager starts the task. Operation 544 is next, where the action results are returned to a database (e.g., on a dedicated server). The method ends in operation 546.

Figure 6:
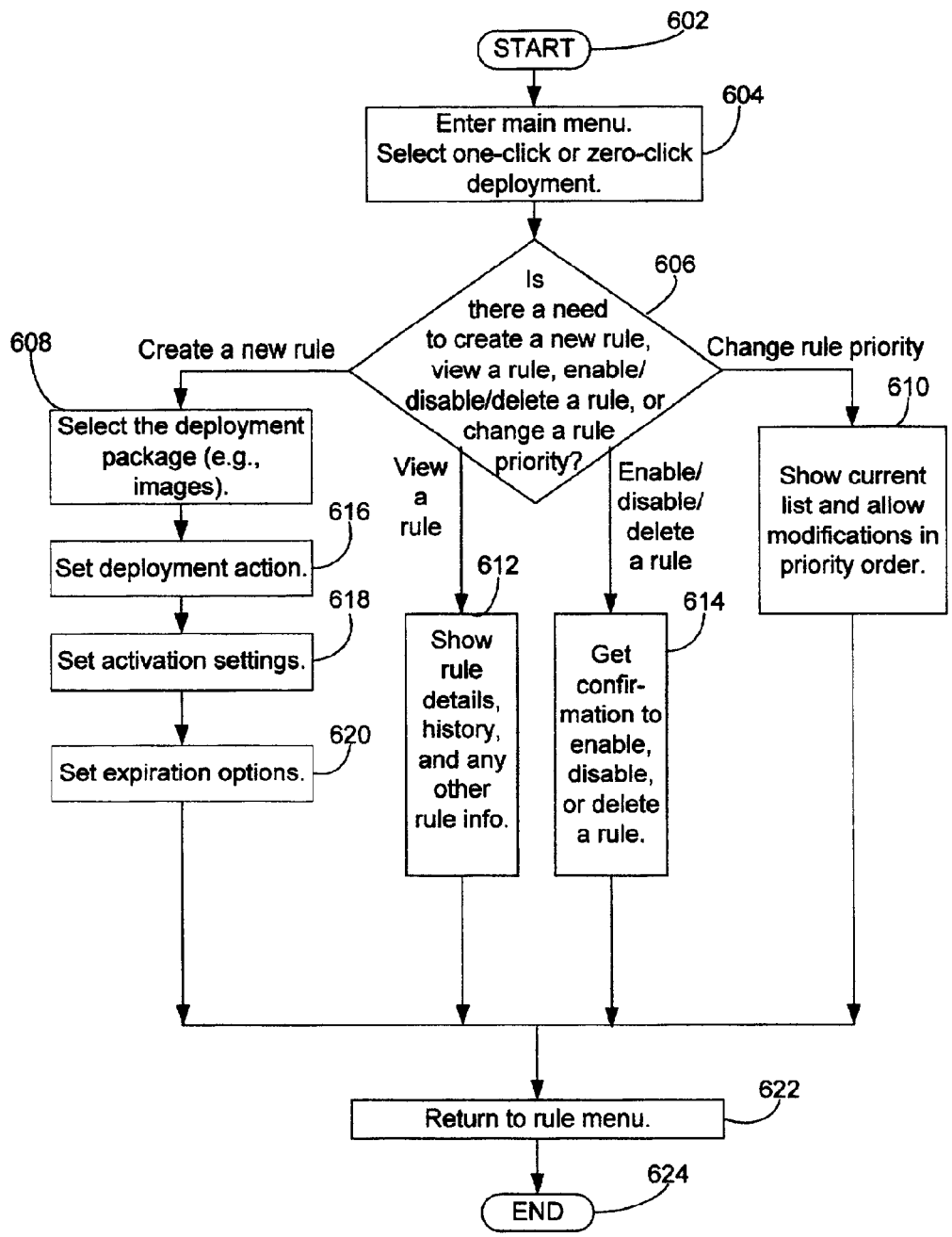
FIG. 6 illustrates a more detailed flow chart of a method for deploying data processing system(s) in accordance with one embodiment of the invention.

FIG. 6 illustrates a more detailed flow chart of a method for deploying data processing system(s) in accordance with one embodiment of the invention. The method starts in operation 602. In operation 604, the deployment process begins by the selection of the type of action needed. In operation 606, a test is made to determine if there is a need for a new rule, to view a rule, enable/disable/delete a rule, or change a rule priority. If a new rule is needed, then operation 608 is next, where the deployment package is selected (e.g., the images of the data processing system). Then operation 616 is next, where the deployment action is set. Operation 618 is next, where the activation settings are set. Operation 620 is next, where the expiration options are set. Then operation 622 is next with a return to the rule menu. If the test of operation 606 determines there is a need to view a rule, then operation 612 is next, where the rule details, rule history, and associated rule information is shown. Then operation 622 is next with a return to the rule menu. If the test of operation 606 determines there is a need to enable a rule, disable a rule, or delete a rule, then operation 614 is next, where a request for confirmation is made to enable the rule, disable the rule, or delete the rule. Then operation 622 is next with a return to the rule menu. If the test of operation 606 determines there is a need to change a rule priority, then operation 610 is next, where a the current list of rule priorities is shown and modifications are allowed. Then operation 622 is next with a return to the rule menu. The method ends in operation 624. Preferably, the rules are active in the background of the deployment center.

In a more preferred embodiment, events are added and may be scheduled using the functional area menu item. Then scheduled events may be manipulated using the scheduler options shown in FIG. 7, where the rules listed in FIG. 6 are also seen.

Figure 7:
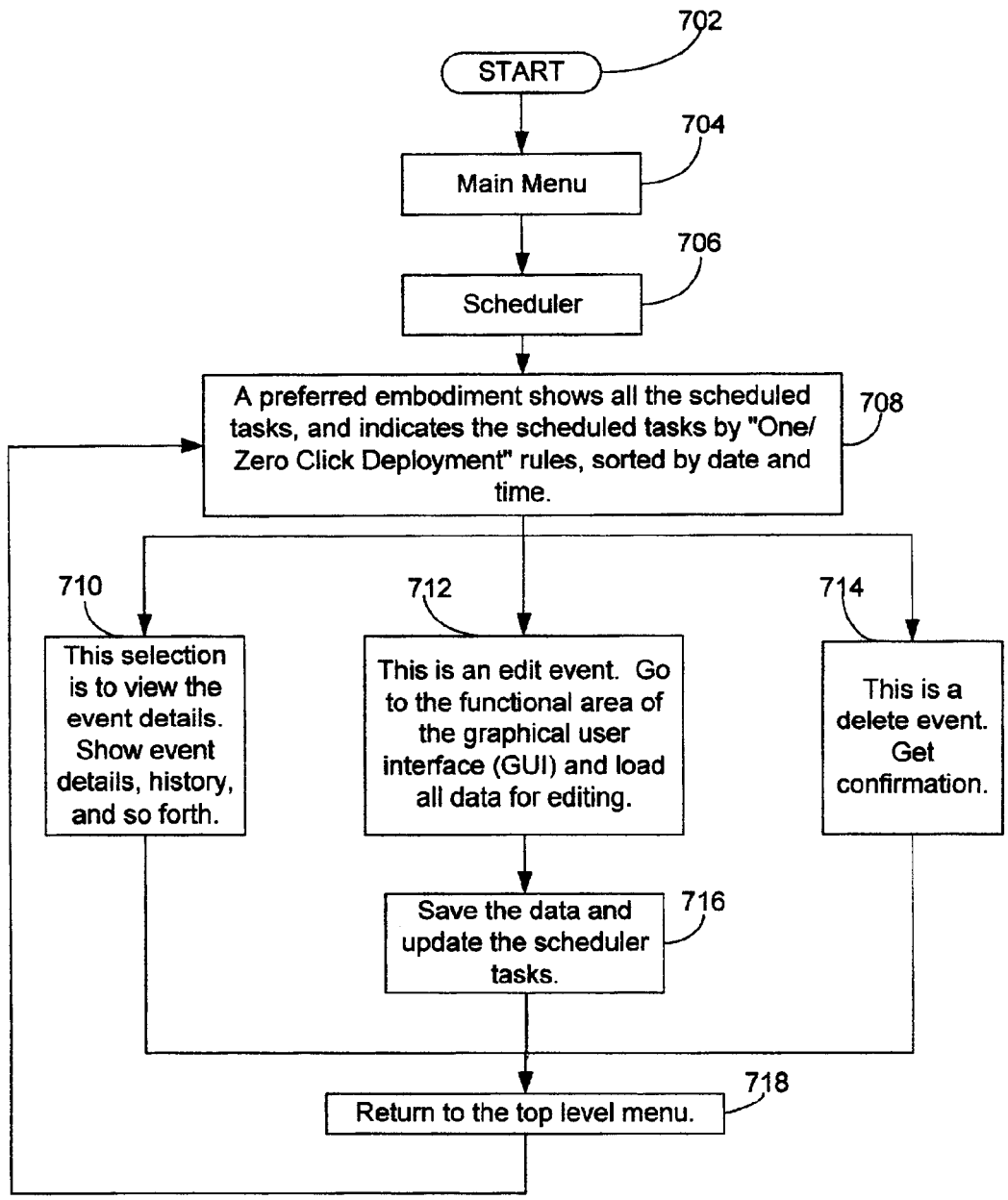
FIG. 7 illustrates a flow chart of image capture, in accordance with one preferred embodiment of the invention.

FIG. 7 illustrates a flow chart of the scheduler, in accordance with one preferred embodiment of the invention. The method starts in operation 702. In operation 704, the user begins by entering a GUI main menu. Operation 706 is next, where the scheduler menu is entered. Operation 708 is next, where all the scheduled tasks are shown (including the one-click or zero-click deployment rules), and indicated by one-click or zero-click deployment rules, sorted by date and time (or by some other convenient characteristic). A test is made to determine if the selection is to view the event details, edit an event, or delete an event. If the test of operation 708 determines the event details are to be viewed, then operation 710 is next, where the event details, event history, and other information are shown. Then operation 718 is next, where there is a return to the top-level menu. If the test of operation 708 determines an event is to be edited, then operation 712 is next, where the event editing functional area of the GUI is entered and all the data for event editing is loaded. Then operation 716 is next, where the data is saved and the scheduler tasks are updated. Then operation 718 is next, where there is a return to the top-level menu. If the test of operation 708 determines that an event is to be deleted, then operation 714 is next, where a confirmation is requested before the event deletion proceeds. Then operation 718 is next, where there is a return to the top-level menu.

Figure 8:
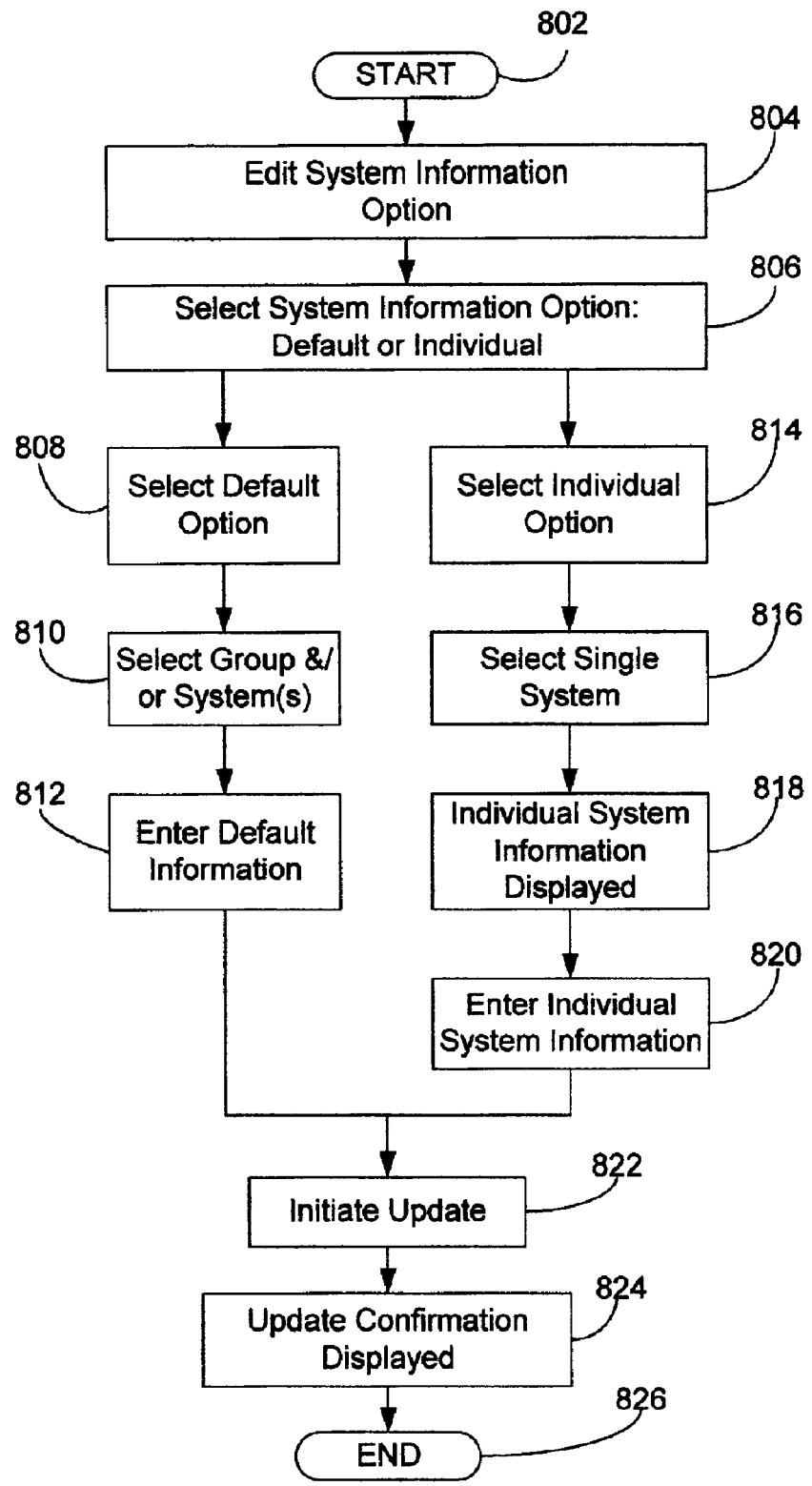
FIG. 8 illustrates a flow chart involving asset management of one or more data processing systems, in accordance with one preferred embodiment of the invention.

FIG. 8 illustrates a flow chart involving asset management of one or more data processing systems, in accordance with one preferred embodiment of the invention. The method starts in operation 802. Operation 804 is next, where edit system information option is selected. Operation 806 is next, where the system information option is selected: default information or individual information. If the test of operation 806 determines a default information option is selected, then operation 808 is next. Then operation 810 is next, where the group and/or system(s) are selected. Then operation 812 is next, where the default information is entered. Then operation 822 is next, where the update is initiated. If the test of operation 806 determines an individual information option is selected, then operation 814 is next. Then operation 816 is next, where the single system is selected. Then operation 818 is next, where the individual system information is displayed. Then operation 820 is next, where the individual system information is entered. Then operation 822 is next, where the update is initiated. Operation 824 is next, where an update confirmation is displayed. The method ends in operation 826.

Figure 9:
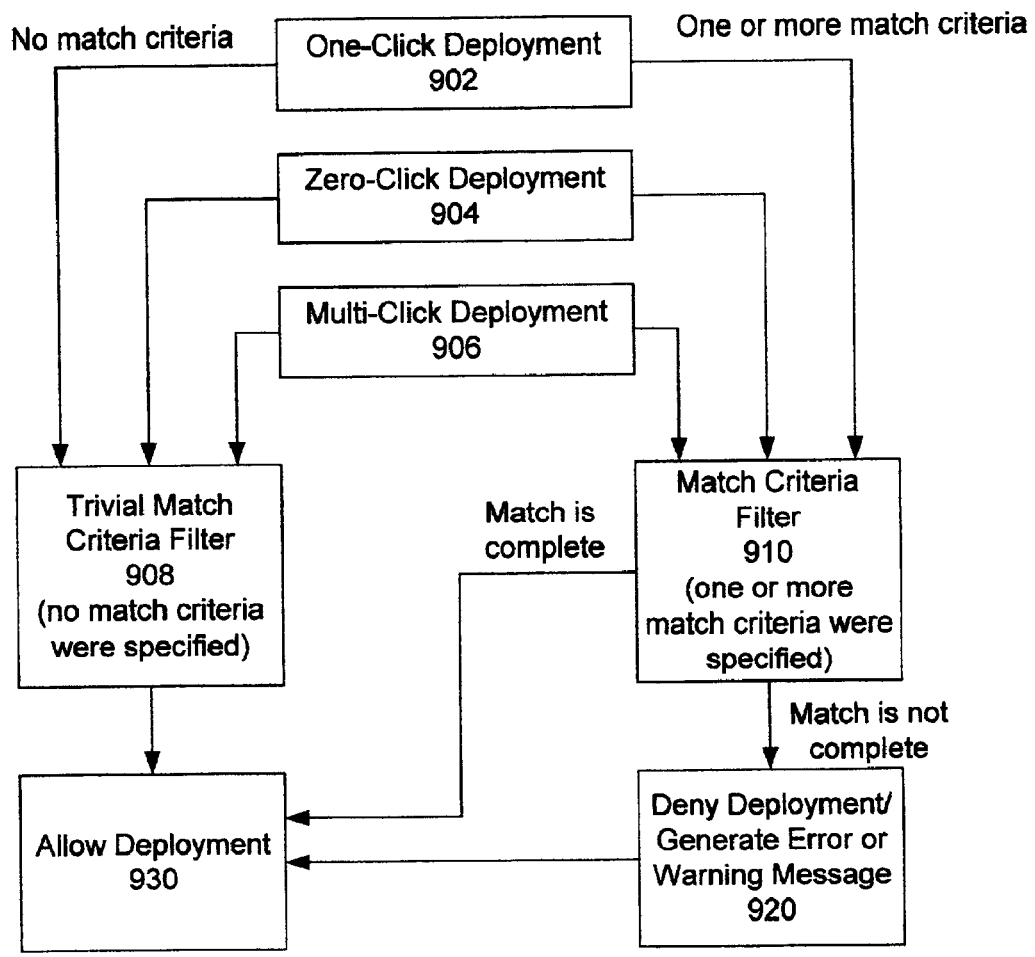
FIG. 9 illustrates the relationship between attribute match criteria and various types of deployment, in accordance with various embodiments of the invention.

FIG. 9 illustrates the relationship between attribute match criteria and various types of deployment, in accordance with various embodiments of the invention. Three different types of deployment embodiments are shown: one-click deployment 902, zero-click deployment 904, and multi-click deployment 906. In cases where there is no attribute match criteria specified, deployment involves a "trivial filter" 908. In cases where there is one or more attribute match criteria specified, deployment involves a "match criteria/filter" 910. In the case where the deployment is done through the "trivial filter" 908, the next step is to "allow deployment" 930. In the case where there is a mismatch in attribute matching in the "match criteria/filter" 910, the next step is to "generate error/warning" 920, which is then followed by the step "allow deployment" 930. Preferred embodiments handle an attribute match failure by generating an error or warning before automatically continuing with deployment (e.g., when there is a "minor" mismatch/error in attributes), by generating an error or warning and stopping deployment (e.g., when there is a "major" mismatch/error in attributes), or by generating an error or warning, and suspending deployment until the deployment software decides to continue with deployment (e.g., when there is a mismatch/error in attributes).

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to deploy one or more data processing systems, comprising:

informing a task manager about a reference data processing system that has been found;

capturing deployment information from the reference data processing system to deploy on said one or more data processing systems, wherein said deployment information is stored in a memory;

selecting said one or more data processing systems;

selecting a package of said deployment information to be deployed in said one or more data processing systems; and intelligently deploying said one or more data processing systems without human intervention, wherein said intelligently deploying is based on said deployment information that was captured, and includes referencing said package of said deployment information that is stored in said memory.

2. The method of claim 1, wherein said deployment information in said memory is stored on a dedicated data processing system connected to a computer network.

3. The method of claim 1, wherein capturing said deployment information includes refreshing said deployment information.

4. The method of claim 1, wherein capturing said deployment information includes referencing deployment information stored from a previous instance of deployment of one or more data processing systems.

5. The method of claim 1, wherein said deployment information includes information selected from the group of information consisting of: disk drive partitions, disk drive settings, firmware settings, fixed code settings, operating system information, application software package information, personalization information, and configuration information.

6. The method of claim 1, wherein said deployment information includes a hardware portion of a configuration and a remaining portion of said configuration, and said intelligently deploying can update said hardware portion of said configuration on a data processing system of said one or more data processing systems before software image deployment, without destructively modifying said remaining portion of said configuration of said one or more data processing systems.

7. The method of claim 1, wherein said deployment information includes a hardware portion of a configuration and a remaining portion of said configuration, and said intelligently deploying can update said hardware portion of said configuration on a data processing system of said one or more data processing systems that has already been configured, without destructively modifying said remaining portion of said configuration of said one or more data processing systems.

8. The method of claim 1, wherein the task manager is informed about the reference data processing system by a software plug-in.

9. The method of claim 1, further comprising:

informing a scheduler about the reference data processing system, wherein the scheduler is informed by the task manager.

10. The method of claim 9, further comprising:

communicating, by the scheduler, to an intelligent deploy logic in order to have rules applied to the one or more data processing systems.

11. A computer network to facilitate the intelligent deployment of one or more data processing systems, comprising:

one or more data processing systems to be intelligently deployed;

one or more reference data processing systems containing deployment information;

means for transmission capable of conveying said deployment information to said one or more data processing systems without human intervention;

wherein the means for transmission comprises means for informing a task manager about the one or more reference data processing systems; and a dedicated data processing system containing deployment information copied from said one or more reference data processing systems, wherein said dedicated data processing system conveys to said one or more data processing systems over said means for transmission a package of deployment information selected from said deployment information, which is based on said deployment information that was captured.

12. The computer network of claim 11, further comprising:

a memory in said dedicated data processing system to store said package of said deployment information.

13. The computer network of claim 8, wherein capturing said deployment information includes referencing deployment information stored from a previous instance of intelligent deployment of one or more data processing systems.

14. The computer network of claim 11, wherein said deployment information includes information selected from the group of information consisting of: disk drive partitions, disk drive settings, firmware settings, fixed code settings, operating system information, application software package information, personalization information, and configuration information.

15. The computer network of claim 11, wherein said deployment information includes a hardware portion of a configuration and a remaining portion of said configuration, and said computer network can update said hardware portion of said configuration on a data processing system of said one or more data processing systems before software image deployment, without destructively modifying said remaining portion of said configuration of said one or more data processing systems.

16. The computer network of claim 11, wherein said deployment information includes a hardware portion of a configuration and a remaining portion of said configuration, and said computer network can update said hardware portion of said configuration on a data processing system of said one or more data processing systems that has already been configured, without destructively modifying said remaining portion of said configuration of said one or more data processing systems.

17. The computer network of claim 11, wherein the task manager is informed about the one or more reference data processing systems by a software plug-in.

18. The computer network of claim 11, wherein the task manager informs a scheduler about the one or more reference data processing systems.

19. The computer network of claim 18, further comprising:
wherein the scheduler communicates to an intelligent deploy logic in order to have rules applied to the one or more data processing systems.

20. A computer program embodied on electronically-readable media, containing instructions to facilitate the deployment of one or more data processing systems, comprising:
a program code segment to inform a task manager about a reference data processing system that has been found;
a program code segment to capture deployment information from the reference data processing system to deploy on said one or more data processing systems, wherein said deployment information is stored in a memory;
a program code segment to select said one or more data processing systems;
a program code segment to select a package of said deployment information to be deployed on said one or more data processing systems; and
a program code segment to intelligently deploy said one or more data processing systems without human intervention, including program code to reference said package of said deployment information that is stored in said memory.

21. The computer program of claim 20, wherein said memory that stores said package of said deployment information is included in a dedicated data processing system.

22. The computer program of claim 20, wherein said program code segment to capture deployment information from a reference data processing system to deploy on said one or more data processing systems is executed on a data processing system coupled to a network of data processing systems.

23. The computer program of claim 20, wherein said program code segment to select one or more data processing systems to be included in said one or more data processing systems is executed on a data processing system coupled to a network of data processing systems.

24. The computer program of claim 20, wherein said program code segment to select a package of said deployment information to be deployed on said one or more data processing systems is executed on a data processing system coupled to a network of data processing systems.

25. The computer program of claim 20, wherein said program code segment to intelligently deploy said one or more data processing systems interacts with an Internet server.

26. The computer program of claim 20, wherein said electronically-readable memory is a non-volatile memory selected from the group of non-volatile memories consisting of: a magnetic disk drive, a magneto-optic disk drive, a floppy diskette, a compact disc, and a flash memory.

* * * * *